United States Patent
Vaid et al.

(10) Patent No.: US 10,750,119 B2
(45) Date of Patent: Aug. 18, 2020

(54) VEHICLE CAMERA LVDS REPEATER

(71) Applicant: MAGNA ELECTRONICS INC., Auburn Hills, MI (US)

(72) Inventors: Vivek Vaid, South Lyon, MI (US); Nazar F. Bally, Sterling Heights, MI (US); Yuesheng Lu, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 298 days.

(21) Appl. No.: 15/784,227

(22) Filed: Oct. 16, 2017

(65) Prior Publication Data

US 2018/0109755 A1     Apr. 19, 2018

Related U.S. Application Data

(60) Provisional application No. 62/408,954, filed on Oct. 17, 2016.

(51) Int. Cl.
*H04N 7/10* (2006.01)
*B60R 1/00* (2006.01)
*H04N 5/232* (2006.01)
*H04N 7/18* (2006.01)

(52) U.S. Cl.
CPC ............ *H04N 7/102* (2013.01); *B60R 1/00* (2013.01); *H04N 5/23293* (2013.01); *H04N 7/18* (2013.01); *H04N 7/183* (2013.01); *B60R 2300/607* (2013.01); *B60R 2300/80* (2013.01)

(58) Field of Classification Search
USPC .......................................................... 348/148
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,266,082 B1 | 7/2001 | Yonezawa et al. |
| 6,266,442 B1 | 7/2001 | Laumeyer et al. |
| 6,297,781 B1 | 10/2001 | Turnbull et al. |
| 6,310,611 B1 | 10/2001 | Caldwell |
| 6,333,759 B1 | 12/2001 | Mazzilli |
| 6,430,303 B1 | 8/2002 | Naoi et al. |
| 6,690,268 B2 | 2/2004 | Schofield et al. |
| 6,704,621 B1 | 3/2004 | Stein et al. |
| 6,714,331 B2 | 3/2004 | Lewis et al. |
| 6,795,221 B1 | 9/2004 | Urey |

(Continued)

*Primary Examiner* — William C Vaughn, Jr.
*Assistant Examiner* — Naod W Belai
(74) *Attorney, Agent, or Firm* — Honigman LLP

(57) ABSTRACT

A vision system of a vehicle includes a camera disposed at a vehicle and having a field of view exterior of the vehicle. The camera captures image data and outputs a low voltage differential signal (LVDS). The system includes an LVDS repeater that receives the LVDS signal output by the camera and outputs at least two LVDS outputs to respective receivers. Each of the at least two LVDS outputs is representative of the LVDS signal output by the camera. The receivers include a receiver of respective ones of at least two devices selected from the group consisting of (i) a vehicle head unit, (ii) a display device, (iii) an electronic control unit of the vehicle and (iv) an image processor for a driver assistance function.

20 Claims, 4 Drawing Sheets

(56) References Cited

U.S. PATENT DOCUMENTS

| | | |
|---|---|---|
| 7,004,593 B2 | 2/2006 | Weller et al. |
| 7,038,577 B2 | 5/2006 | Pawlicki et al. |
| 7,113,867 B1 | 9/2006 | Stein |
| 7,151,996 B2 | 12/2006 | Stein |
| 7,375,803 B1 | 5/2008 | Bamji |
| 7,676,087 B2 | 3/2010 | Dhua et al. |
| 7,720,580 B2 | 5/2010 | Higgins-Luthman |
| 7,786,898 B2 | 8/2010 | Stein et al. |
| 7,843,451 B2 | 11/2010 | Lafon |
| 7,855,755 B2 | 12/2010 | Weller et al. |
| 7,930,160 B1 | 4/2011 | Hosagrahara et al. |
| 7,949,486 B2 | 5/2011 | Denny et al. |
| 8,064,643 B2 | 11/2011 | Stein et al. |
| 8,082,101 B2 | 12/2011 | Stein et al. |
| 8,164,628 B2 | 4/2012 | Stein et al. |
| 8,254,635 B2 | 8/2012 | Stein et al. |
| 8,378,851 B2 | 2/2013 | Stein et al. |
| 8,452,055 B2 | 5/2013 | Stein et al. |
| 8,508,350 B2 | 8/2013 | Nix et al. |
| 8,553,088 B2 | 10/2013 | Stein et al. |
| 8,814,401 B2 | 8/2014 | Higgins-Luthman et al. |
| 9,495,876 B2 | 11/2016 | Lu et al. |
| 9,508,014 B2 | 11/2016 | Lu et al. |
| 9,509,310 B1 * | 11/2016 | Goumballa .............. H04B 1/04 |
| 2003/0137586 A1 | 7/2003 | Lewellen |
| 2003/0222982 A1 | 12/2003 | Hamdan et al. |
| 2005/0237385 A1 | 10/2005 | Kosaka et al. |
| 2007/0024724 A1 | 2/2007 | Stein et al. |
| 2007/0104476 A1 | 5/2007 | Yasutomi et al. |
| 2007/0242339 A1 | 10/2007 | Bradley |
| 2008/0043099 A1 | 2/2008 | Stein |
| 2008/0175378 A1 * | 7/2008 | Borgen .................. H04L 9/065 380/42 |
| 2008/0266396 A1 | 10/2008 | Stein |
| 2009/0290032 A1 | 11/2009 | Zhang et al. |
| 2012/0044351 A1 | 2/2012 | Kook |
| 2012/0069184 A1 * | 3/2012 | Hottmann ................ B60R 1/00 348/148 |
| 2012/0069185 A1 | 3/2012 | Stein |
| 2012/0162427 A1 | 6/2012 | Lynam |
| 2012/0200707 A1 | 8/2012 | Stein et al. |
| 2013/0141580 A1 | 6/2013 | Stein et al. |
| 2013/0147957 A1 | 6/2013 | Stein |
| 2013/0169812 A1 | 7/2013 | Lu et al. |
| 2013/0314503 A1 | 11/2013 | Nix et al. |
| 2014/0043473 A1 | 2/2014 | Gupta et al. |
| 2014/0085472 A1 | 3/2014 | Lu et al. |
| 2014/0139670 A1 | 5/2014 | Kesavan et al. |
| 2014/0152778 A1 | 6/2014 | Ihlenburg et al. |
| 2014/0168428 A1 | 6/2014 | Nefedov et al. |
| 2014/0340510 A1 | 11/2014 | Ihlenburg et al. |
| 2016/0191795 A1 | 6/2016 | Han et al. |
| 2016/0272118 A1 | 9/2016 | Kim et al. |
| 2017/0039084 A1 | 2/2017 | Atsmon et al. |
| 2017/0085807 A1 * | 3/2017 | Tsujioka ................ H04N 5/268 |
| 2017/0163867 A1 | 6/2017 | Ihlenburg et al. |
| 2017/0223269 A1 | 8/2017 | Fluegel |
| 2017/0223306 A1 | 8/2017 | Lu et al. |

* cited by examiner

VEHICLE CAMERA LVDS REPEATER

CROSS REFERENCE TO RELATED APPLICATION

The present application claims the filing benefits of U.S. provisional application Ser. No. 62/408,954, filed Oct. 17, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known.

Examples of such known systems are described in U.S. Pat. Nos. 5,949,331; 5,670,935 and/or 5,550,677, which are hereby incorporated herein by reference in their entireties. FIG. 2 shows a common implementation block diagram of a digital camera of a vehicle with a Low Voltage Differential Signaling (LVDS) signal output to a vehicle head unit/display in the vehicle.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a method of duplicating (or repeating) an automotive camera signal two or more times. The present invention provides a means to repeat the LVDS signal to multiple outputs. The system is preferably a plug and play type system that allows for application of the repeater to various camera applications or vision system applications or driver assistance systems or the like.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
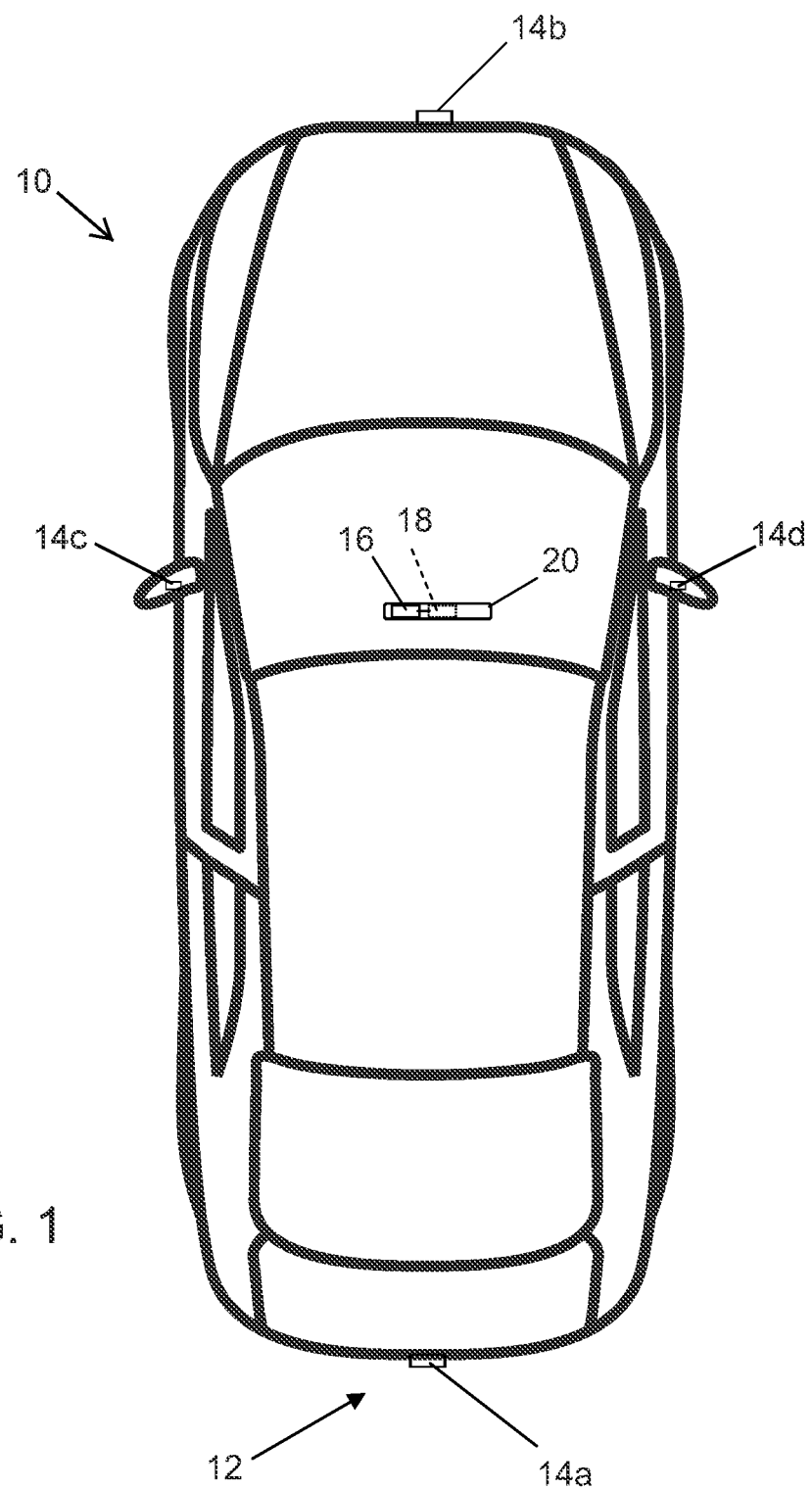
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
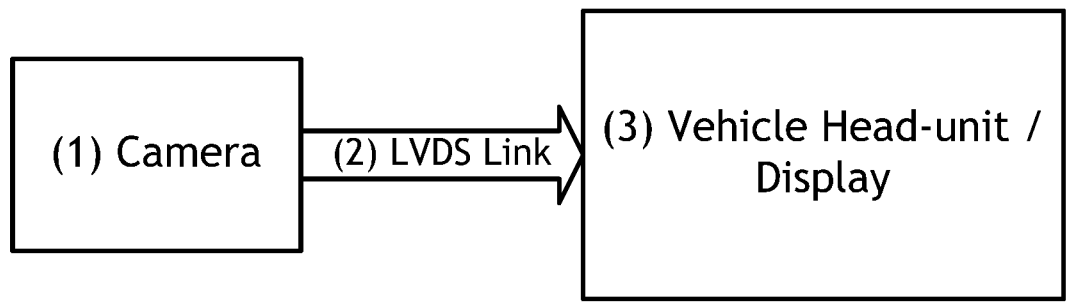
FIG. 2 is a known implementation block diagram of a digital camera with Low Voltage Differential Signaling (LVDS) signal output in a vehicle.

FIG. 2 shows a common implementation block diagram of a digital camera with Low Voltage Differential Signaling (LVDS) signal output in a vehicle. This shows a standard implementation or block diagram of Digital (LVDS) Camera in ADAS. The camera (1) creates an image of the environment, and outputs it in LVDS (2) electrical signal format. The LVDS is received by one and only receiver, such as Vehicle Head-unit (3) for display. Due to the nature of an LVDS signal, and underlying encoding schemes employed, the LVDS signal cannot be simply "Y" connected for consumption of 2 or more receivers. Thus there is a need of a device or method to "repeat" the LVDS signal for consumption of multiple receivers.

Figure 3:
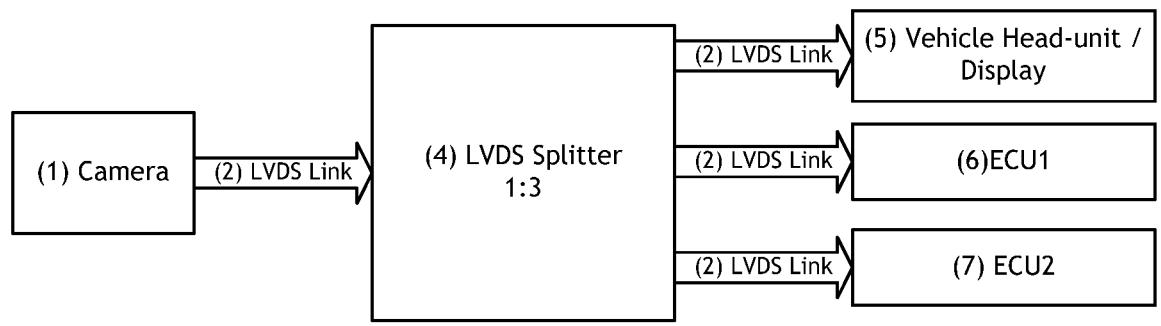
FIG. 3 is a block diagram showing use of an LVDS splitter in accordance with the present invention.

FIG. 3 shows an LVDS splitter (4) as used in an example vehicle application, such as a system with three or four receivers. The camera (1) captures image data representative of an image of the environment, and outputs it in LVDS (2) electrical signal format. The LVDS is received by an LVDS Splitter/Repeater (4). The LVDS Repeater outputs the image to three receivers in this example—a head-unit (5), a first electronic control unit or ECU1 (6) and a second electronic control unit or ECU2 (7).

Figure 4:
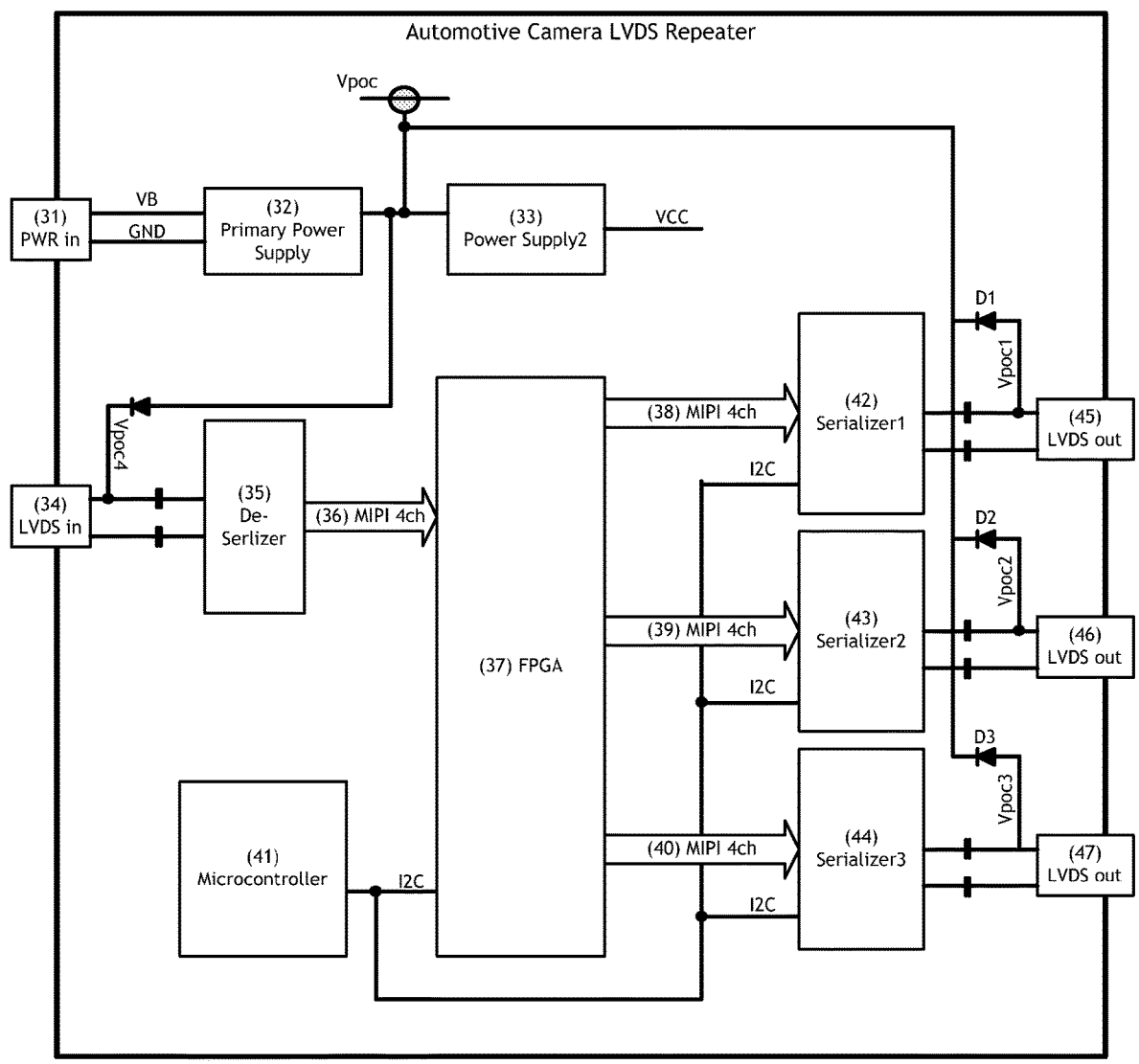
FIG. 4 is a block diagram of an LVDS splitter of the present invention.

As shown in FIG. 4, an embodiment or internal block diagram of the proposed LVDS Splitter (4) includes an LVDS input (34) and three LVDS outputs (45, 46, 47). The LVDS signal is received from the camera or LVDS source via connector (34), and provided to a complementary de-Serializer (35). In Automotive LVDS signals, the Source Serializer and Receiving De-Serializer should be complementary or from the same family, so the encoding, decoding and encryption protocols match. The De-Serializer transmits signals to a field-programmable gate array or FPGA (37). These signals may be in MIPI (36) format as shown in FIG. 4, or they may be Parallel, depending on type of de-Serializer used.

The FPGA (37) performs the repeating of signals function and outputs the same data to multiple MIPI (Mobile Industry Processor Interface) buses. In the example embodiment of FIG. 4, the FPGA performs a 1:3 repeat function, and outputs data to three busses: (38), (39), (40), which are then encoded into LVDS signals by Serializer1 (42), Serializer2 (43), Serializer3 (44), respectively. The repeated LVDS data is output on 3 connectors (45), (46), (47).

Optionally, the Automotive LVDS bus may also have Power-Over-Coax (PoC) Capability. If such a feature is in use in the vehicle LVDS bus, the proposed repeater design can make full use of such PoC. The design is capable to use this power for the repeater itself, and the connected remote camera on connector (34). This PoC utilization is described below.

As shown in FIG. 4, the diode D1 routes PoC voltage Vpoc1 to Vpoc, thus if the receiver connected on (45) has a PoC source capable to power the repeater and camera, Vpoc1 can source the desired current. The diode D2 routes PoC voltage Vpoc2 to Vpoc, thus if the receiver connected on (46) has a PoC source capable to power the repeater and camera, Vpoc2 can source the desired current. Likewise, the diode D3 routes PoC voltage Vpoc3 to Vpoc, thus if the Receiver connected on (47) has a PoC source capable to power the repeater and Camera, Vpoc3 can source the desired current. Moreover, such a configuration allows for current superposition from multiple PoC sources connected to either (45), (46), (47) in any combination. This is useful if one PoC source receiver does not have sufficient current capability to drive the whole system (e.g., camera and repeater).

If No PoC source is present, or PoC Source(s) do not have enough current capability to driver the camera and repeater unit, the vehicle battery or ignition power shall supply to connector (31). The primary power supply (32) shall be set to desired PoC voltage so the camera connected to (34) can be sourced with PoC.

The Microcontroller (41) is present to initialize all the de-serializers (35) and serializers (42), (43), (44) on the board. It may be useful to bring any intelligence or control needed for the board in future. The I2C bus is also connected to microcontroller (41) and FPGA (37) for control or intelligent software behavior needed to switch ON/OFF various MIPI busses. The system may also control the devices on the I2C bus such that only one of the LVDS receivers (not illustrated here) can send I2C messages through LVDS back channel.

Figure 5:
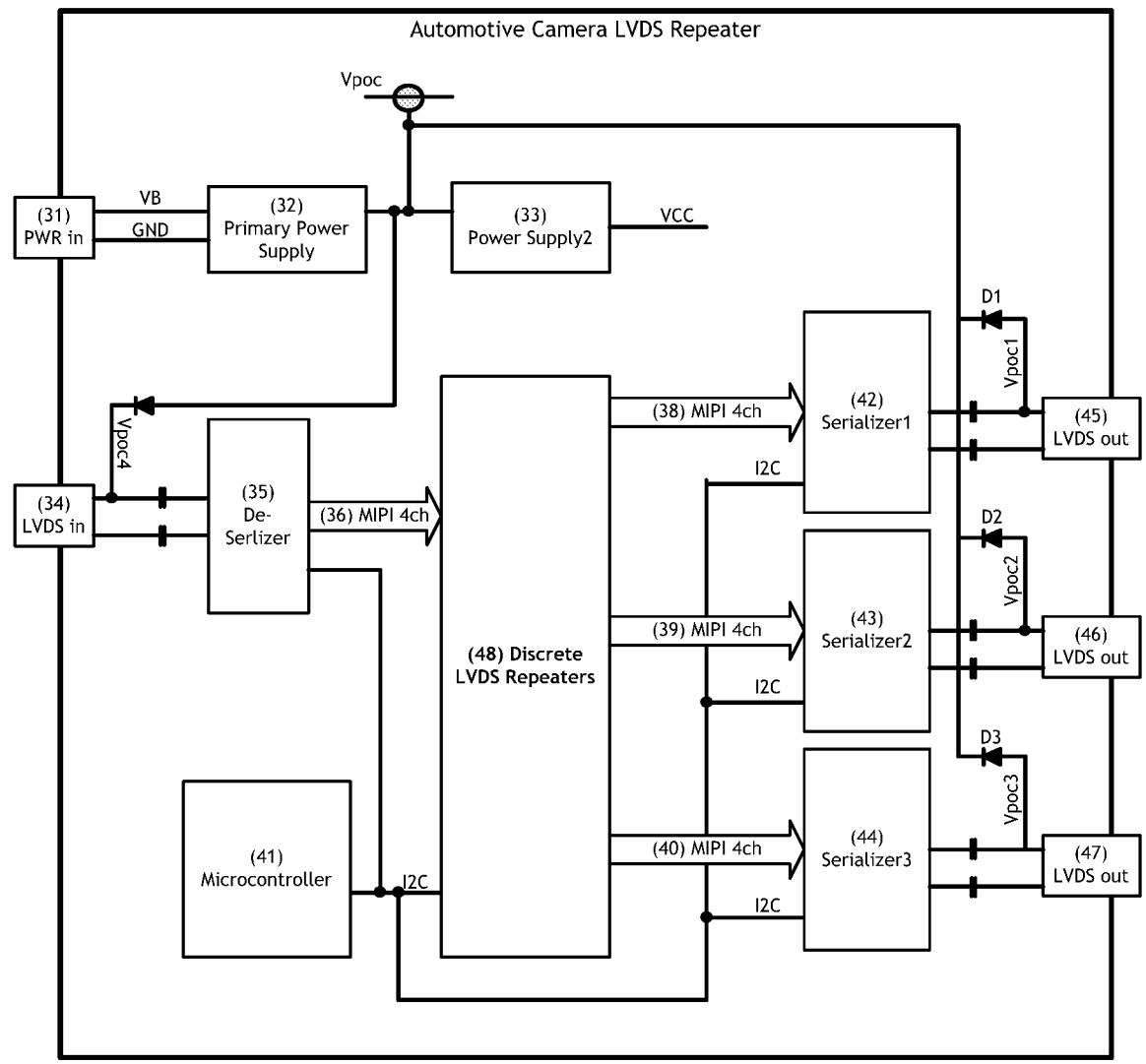
FIG. 5 is a block diagram of another LVDS splitter of the present invention.

Optionally, and with reference to FIG. 5, another embodiment is shown using discrete off-the-shelf LVDS repeaters. However, since those off-the-shelf ICs cannot be connected to the vehicle LVDS bus on (34), (45), (46), (47), the block diagram will remain almost the same as FIG. 4, except with the FPGA (37) replaced by off-the-shelf LVDS repeater ICs (48).

The vision system and/or camera(s) may utilize aspects of the vision systems and cameras described in U.S. Publication No. US-2017-0223306, which his hereby incorporated herein by reference in its entirety.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486;

US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Optionally, the camera may comprise a forward facing camera, such as disposed at a windshield electronics module (WEM) or the like. The forward facing camera may utilize aspects of the systems described in U.S. Pat. Nos. 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system of a vehicle, said vision system comprising:
    a camera disposed at a vehicle and having a field of view exterior of the vehicle;
    wherein said camera captures image data and outputs a low voltage differential signal (LVDS);
    an LVDS repeater disposed at the vehicle, wherein said LVDS repeater receives the LVDS signal output by said camera and outputs at least two LVDS outputs to at least two respective and independent receivers, and wherein each of the at least two LVDS outputs is representative of the same LVDS signal output by said camera;
    wherein said LVDS repeater comprises a de-serializer to de-serialize the LVDS signal output by said camera;
    wherein said LVDS repeater comprises at least two serializers to serialize the at least two LVDS outputs to the at least two respective and independent receivers;
    wherein said receivers comprise a receiver of respective ones of at least two devices selected from the group consisting of (i) a vehicle head unit of the vehicle, (ii) a display device of the vehicle, (iii) an electronic control unit of the vehicle and (iv) an image processor for a driver assistance system of the vehicle; and
    wherein said LVDS repeater is powered at least in part via power-over-coax (PoC) from at least one of said at least two devices selected from the group consisting of (i) a vehicle head unit of the vehicle, (ii) a display device of the vehicle, (iii) an electronic control unit of the vehicle and (iv) an image processor for a driver assistance system of the vehicle.

2. The vision system of claim 1, wherein said LVDS repeater outputs a first LVDS output to a receiver of a vehicle head unit of the vehicle and outputs a second LVDS output to a receiver of an electronic control unit of the vehicle.

3. The vision system of claim 1, wherein said LVDS repeater outputs at least three LVDS outputs to respective ones of three receivers.

4. The vision system of claim 3, wherein said LVDS repeater outputs a first LVDS output to a vehicle head unit of the vehicle, outputs a second LVDS output to a first electronic control unit of the vehicle, and outputs a third LVDS output to a second electronic control unit of the vehicle.

5. The vision system of claim 3, wherein said LVDS repeater outputs a first LVDS output to a receiver of a vehicle head unit of the vehicle, outputs a second LVDS output to a receiver of an image processor for a driver assistance system of the vehicle, and outputs a third LVDS output to an electronic control unit of the vehicle.

6. The vision system of claim 1, wherein said LVDS repeater comprises a field-programmable gate array that receives a de-serialized signal from the de-serializer and outputs at least two outputs, and wherein the at least two serializers each receive a respective one of the outputs from the field-programmable gate array and output the respective LVDS output to the respective receiver.

7. The vision system of claim 6, wherein the field-programmable gate array outputs at least two Mobile Industry Processor Interface (MIPI) outputs.

8. The vision system of claim 1, wherein said LVDS repeater comprises at least two discrete LVDS repeaters that receive a respective de-serialized signal from the de-serializer and that output a respective output, and wherein the at least two serializers each receive a respective output from a respective one of the LVDS repeaters and output the respective LVDS output to the respective receiver.

9. The vision system of claim 8, wherein the at least two discrete LVDS repeaters output respective Mobile Industry Processor Interface (MIPI) outputs.

10. The vision system of claim 1, wherein said LVDS repeater is powered via the PoC received through each of the LVDS outputs to the receivers.

11. A vision system of a vehicle, said vision system comprising:
a camera disposed at a vehicle and having a field of view exterior of the vehicle;
wherein said camera captures image data and outputs a low voltage differential signal (LVDS);
an LVDS repeater disposed at the vehicle, wherein said LVDS repeater receives the LVDS signal output by said camera and outputs at least two LVDS outputs to at least two respective and independent receivers, and wherein each of the at least two LVDS outputs is representative of the same LVDS signal output by said camera;
wherein said LVDS repeater comprises a de-serializer to de-serialize the LVDS signal output by said camera;
wherein said LVDS repeater comprises at least two serializers to serialize the at least two LVDS outputs to the at least two respective and independent receivers;
wherein said receivers comprise a receiver of respective ones of at least two devices selected from the group consisting of (i) a vehicle head unit of the vehicle, (ii) a display device of the vehicle, (iii) an electronic control unit of the vehicle and (iv) an image processor for a driver assistance system of the vehicle;
wherein said LVDS repeater comprises (i) a de-serializer that de-serializes the received LVDS signal output by said camera, (ii) a field-programmable gate array that receives a de-serialized signal from the de-serializer and outputs at least two outputs, (iii) at least two serializers that each receive a respective one of the outputs of the field-programmable gate array and output the respective LVDS output to the respective receiver; and
wherein said LVDS repeater is powered via power-over-coax (PoC) from each of said at least two devices selected from the group consisting of (i) a vehicle head unit of the vehicle, (ii) a display device of the vehicle, (iii) an electronic control unit of the vehicle and (iv) an image processor for a driver assistance system of the vehicle.

12. The vision system of claim 11, wherein said LVDS repeater outputs a first LVDS output to a receiver of a vehicle head unit of the vehicle and outputs a second LVDS output to a receiver of an electronic control unit of the vehicle.

13. The vision system of claim 11, wherein said LVDS repeater outputs at least three LVDS outputs to respective ones of three receivers.

14. The vision system of claim 13, wherein said LVDS repeater outputs a first LVDS output to a vehicle head unit of the vehicle, outputs a second LVDS output to a first electronic control unit of the vehicle, and outputs a third LVDS output to a second electronic control unit of the vehicle.

15. The vision system of claim 11, wherein the field-programmable gate array outputs at least two Mobile Industry Processor Interface (MIPI) outputs.

16. A vision system of a vehicle, said vision system comprising:
a camera disposed at a vehicle and having a field of view exterior of the vehicle;
wherein said camera captures image data and outputs a low voltage differential signal (LVDS);
an LVDS repeater disposed at the vehicle, wherein said LVDS repeater receives the LVDS signal output by said camera and outputs at least two LVDS outputs to at least two respective and independent receivers, and wherein each of the at least two LVDS outputs is representative of the same LVDS signal output by said camera;
wherein said LVDS repeater comprises a de-serializer to de-serialize the LVDS signal output by said camera;
wherein said LVDS repeater comprises at least two serializers to serialize the at least two LVDS outputs to the at least two respective and independent receivers;
wherein said receivers comprise a receiver of respective ones of at least two devices selected from the group consisting of (i) a vehicle head unit of the vehicle, (ii) a display device of the vehicle, (iii) an electronic control unit of the vehicle and (iv) an image processor for a driver assistance system of the vehicle;
wherein said LVDS repeater comprises at least two discrete LVDS repeaters that receive a respective de-serialized signal from the de-serializer and that output a respective output, and wherein the at least two serializers each receive a respective output from a respective one of the LVDS repeaters and output the respective LVDS output to the respective receiver; and
wherein said LVDS repeater is powered via power-over-coax (PoC) from each of said at least two devices selected from the group consisting of (i) a vehicle head unit of the vehicle, (ii) a display device of the vehicle, (iii) an electronic control unit of the vehicle and (iv) an image processor for a driver assistance system of the vehicle.

17. The vision system of claim 16, wherein said LVDS repeater outputs a first LVDS output to a receiver of a vehicle head unit of the vehicle and outputs a second LVDS output to a receiver of an electronic control unit of the vehicle.

18. The vision system of claim 16, wherein said LVDS repeater outputs at least three LVDS outputs to respective ones of three receivers.

19. The vision system of claim 18, wherein said LVDS repeater outputs a first LVDS output to a vehicle head unit of the vehicle, outputs a second LVDS output to a first electronic control unit of the vehicle, and outputs a third LVDS output to a second electronic control unit of the vehicle.

20. The vision system of claim 16, wherein the at least two discrete LVDS repeaters output respective Mobile Industry Processor Interface (MIPI) outputs.

\* \* \* \* \*